United States Patent
Hudson et al.

(10) Patent No.: US 9,109,371 B2
(45) Date of Patent: Aug. 18, 2015

(54) FOOTHOLD SYSTEM ON SLOPED ROOF

(71) Applicant: Zep Solar LLC, San Rafael, CA (US)

(72) Inventors: Tyrus Hudson, San Rafael, CA (US); John R. West, San Rafael, CA (US)

(73) Assignee: SolarCity Corporation, San Mateo, CA (US)

( * ) Notice: Subject to any disclaimer, the term of this patent is extended or adjusted under 35 U.S.C. 154(b) by 73 days.

(21) Appl. No.: 13/960,327

(22) Filed: Aug. 6, 2013

(65) Prior Publication Data

US 2015/0041251 A1 Feb. 12, 2015

(51) Int. Cl.
*E04G 3/26* (2006.01)
*F16M 13/02* (2006.01)
*H02S 20/23* (2014.01)
*H01L 31/042* (2014.01)

(52) U.S. Cl.
CPC .............. *E04G 3/26* (2013.01); *F16M 13/02* (2013.01); *H02S 20/23* (2014.12); *H02S 40/00* (2013.01)

(58) Field of Classification Search
CPC ............ E04G 3/26; E04G 3/265; E04G 3/22; E04B 1/38; F16M 13/02; H02S 20/23; H02S 20/24; H02S 40/00; F24J 2002/4661; F24J 2/5245; F24J 2/5247
USPC ............ 182/45; 52/173.1; 248/237, 249, 302, 248/175
See application file for complete search history.

(56) References Cited

U.S. PATENT DOCUMENTS

| | | | |
|---|---|---|---|
| 403,636 A * | 5/1889 | Bitterly | 182/20 |
| 1,152,685 A * | 9/1915 | Winn et al. | 248/237 |
| 1,187,369 A * | 6/1916 | Neville | 248/237 |
| 1,308,066 A * | 7/1919 | Hayes | 248/211 |
| 1,500,487 A * | 7/1924 | Carlin | 108/28 |
| 1,625,745 A | 4/1927 | Rhodes | |
| 1,728,613 A * | 9/1929 | Jones | 248/302 |
| 2,439,063 A * | 4/1948 | Shur | 248/536 |
| 2,628,011 A | 2/1953 | Buechler | |
| 2,708,543 A * | 5/1955 | Matich | 182/196 |
| 2,969,151 A * | 1/1961 | Krstulovich | 211/34 |
| 3,802,572 A * | 4/1974 | Shackel | 211/38 |
| 4,398,620 A | 8/1983 | Townsend | |
| 4,836,487 A * | 6/1989 | Ringler | 248/303 |
| 5,143,170 A * | 9/1992 | Hunt et al. | 182/3 |
| 5,143,174 A | 9/1992 | Davis | |
| 5,845,452 A * | 12/1998 | Pantano | 52/698 |
| 5,896,944 A * | 4/1999 | McMillian et al. | 182/45 |
| 6,823,799 B2 * | 11/2004 | Gleave | 104/111 |

(Continued)

OTHER PUBLICATIONS definition of 'block' found in the Action The American Heritage® Dictionary of the English Language, Fourth Edition copyright © 2000 by Houghton Mifflin Company. Updated in 2009. Published by Houghton Mifflin Company. All rights reserved.*

Primary Examiner — Daniel Cahn
(74) Attorney, Agent, or Firm — Larry D. Johnson

(57) ABSTRACT

Foothold system on a sloped roof includes first flashing block with hole, second flashing block with hole, moveable foothold with hook portion removably inserted into first flashing block hole and lower portion comprising a step portion extending down-roof from hook portion, the moveable foothold moveable from first flashing block to second flashing block via unhooking hook portion from first flashing block and hooking hook portion to second flashing block; flashing blocks may include mounting portion to receive mounting foot for photovoltaic array, and/or step portion sized to receive and support weight of foot of human working on sloped roof.

4 Claims, 2 Drawing Sheets

(56) References Cited

U.S. PATENT DOCUMENTS

| | | | |
|---|---|---|---|
| 6,926,241 B2 | 8/2005 | Garrett | |
| 7,823,852 B1* | 11/2010 | Reno | 248/302 |
| 7,832,704 B1* | 11/2010 | Sanders | 249/216 |
| 7,963,074 B2* | 6/2011 | Schwarze et al. | 52/173.3 |
| 8,505,685 B1* | 8/2013 | Rayfield et al. | 182/45 |
| 2002/0046543 A1* | 4/2002 | Neuleib | 52/749.12 |
| 2002/0153200 A1* | 10/2002 | Bryant | 182/45 |
| 2003/0037990 A1* | 2/2003 | Testa, Jr. | 182/45 |
| 2003/0101662 A1* | 6/2003 | Ullman | 52/27 |
| 2007/0034449 A1* | 2/2007 | Leendertse | 182/45 |
| 2010/0307074 A1* | 12/2010 | Stearns et al. | 52/173.1 |
| 2011/0233157 A1* | 9/2011 | Kmita | 211/41.1 |
| 2011/0290587 A1* | 12/2011 | Blazin et al. | 182/107 |
| 2012/0118667 A1* | 5/2012 | Fontaine | 182/45 |
| 2012/0144760 A1* | 6/2012 | Schaefer et al. | 52/58 |
| 2012/0241251 A1* | 9/2012 | Painter | 182/45 |
| 2012/0267193 A1* | 10/2012 | Fontaine | 182/45 |
| 2013/0133270 A1* | 5/2013 | West et al. | 52/58 |
| 2014/0158184 A1* | 6/2014 | West et al. | 136/251 |

* cited by examiner

FOOTHOLD SYSTEM ON SLOPED ROOF

BACKGROUND

Working on steep or sloped roofs is hazardous due to potential slipping, thus there is need for more secure mechanism to prevent worker slippage on such roofs.

SUMMARY

Foothold system on a sloped roof includes first flashing block with hole, second flashing block with hole, moveable foothold with hook portion removably inserted into first flashing block hole and lower portion comprising a step portion extending down-roof from hook portion, the moveable foothold moveable from first flashing block to second flashing block via unhooking hook portion from first flashing block and hooking hook portion to second flashing block; flashing blocks may include mounting portion to receive mounting foot for photovoltaic array, and/or step portion sized to receive and support weight of foot of human working on sloped roof.

DETAILED DESCRIPTION

Figure 1A:
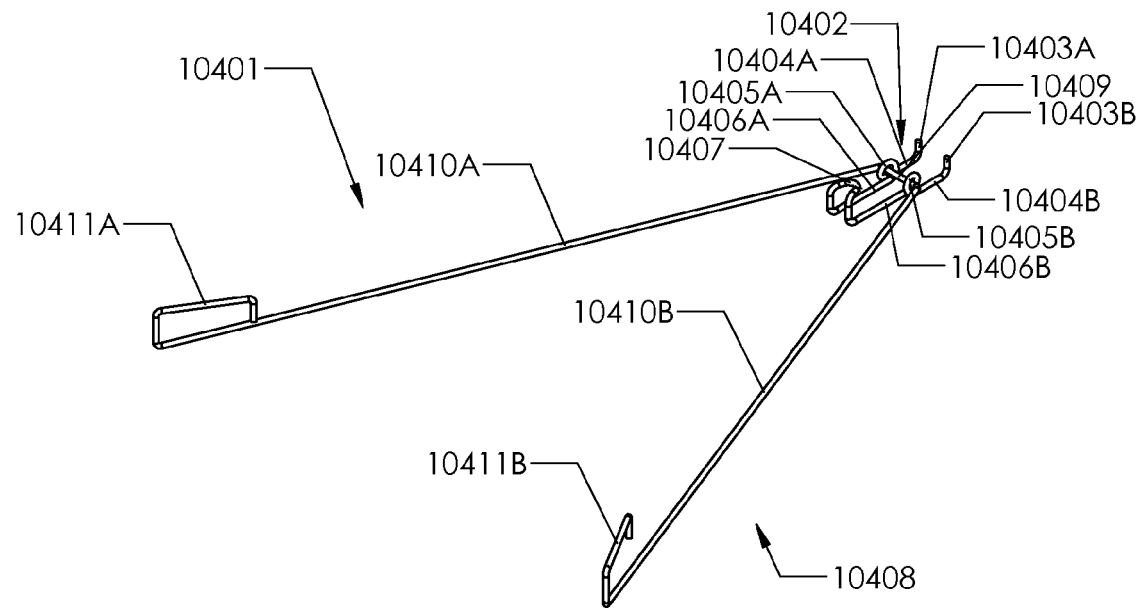
FIGS. 1A and 1B are views of a foothold.
Figure 1B:
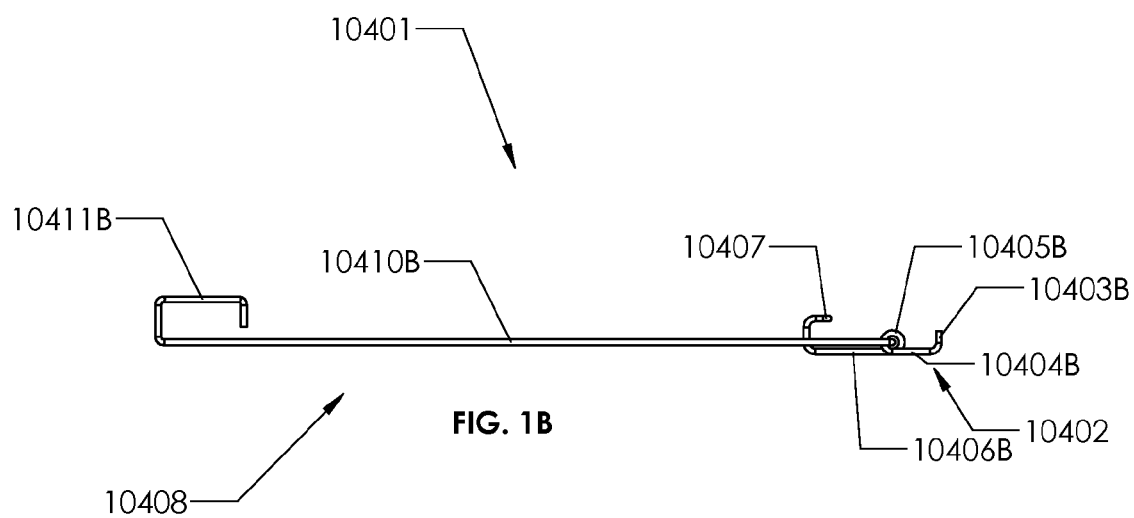
Figure 2:
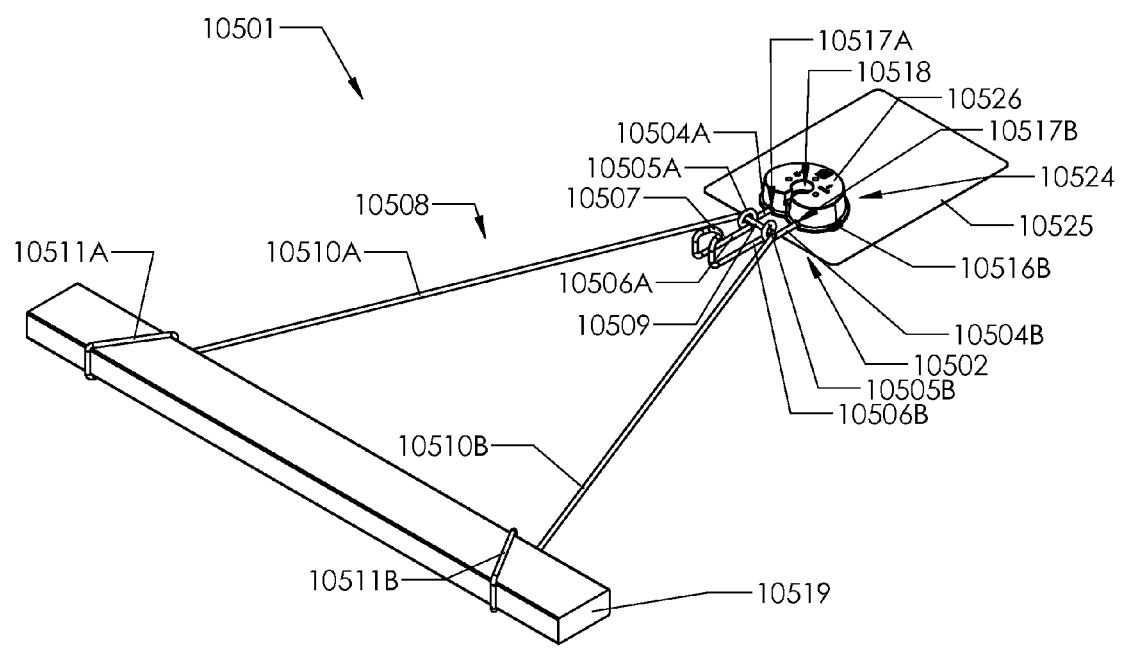
FIG. 2 is a view of an installed foothold.

Referring now to FIGS. 1A-2, wherein like numerals refer to like structures, embodiments of a foothold system, toeboard, or roof ladder ("foothold") are shown. Referring to FIGS. 1A and 1B, a foothold is shown from a perspective view and a side view, respectively. A foothold such as foothold 10401 may include an upper portion 10402 with one or more attachment hooks 10403A and 10403B, one or more upper lengths 10404A and 10404B, one or more loops 10405A and 10405B, optional lower lengths 10406A and 10406B, and optional utility hook 10407. A foothold such as foothold 10401 may further include a lower portion 10408 with a horizontal length 10409 and two or more legs 10410A and 10410B with a lumber hook 10411A and 10411B. For the purpose of this paragraph, "up" or "upward" means skyward, "down" or "downward" means away from the sky, rear, back, or backward refers to the attachment-hook end of the foothold, "front" or "forward" refers to the lumber-hook end of the foothold, "inward" means toward the center line of the foothold running from front to back, and "outward" means away from the centerline of the foothold running front to back. Foothold 10401 may be formed of wire, tubing, cable or another format made of metal, plastic, rubber, or another material. Top portion 10402 may be formed of two upper lengths 10403A and 10403B that may be parallel to one another or may extend at a ten degree, twelve degree, eight degree, or other angle with respect to one another. The backmost ends of upper lengths 10403A and 10403B may extend upward into attachment hooks 10403A and 10403B that may extend 22 millimeters, 20 millimeters, 24 millimeters, or some other length, and attachment hooks 10403A and 10403B may be the same length or different lengths. Upper lengths 10403A and 10403B may intersect attachment hooks 10403A and 10403B at a ninety degree angle, a one hundred degree angle, an eighty-degree angle, or another angle. The front-most ends of upper lengths 10403A and 10403B may extend upward, then curve back, then down, and then forward once again to form loops 10405A and 10405B with outermost diameters that may be the same as the lengths of attachment hooks 10403A and 10403B or different than those lengths. Loops 10405A and 10405B may then extend forward into lower lengths 10406A and 10406B which may be 76 millimeters long, 70 millimeters long, 80 millimeters long, or another length. Lower lengths 10406A and 10406B may then extend upward, backward, and inward toward one another to meet and form optional utility hook 10407. Lower portion 10408 may be formed of horizontal length 10409 which may be 19 millimeters long, 20 millimeters long, 30 millimeters long, or some other length and which may be oriented perpendicular to upper lengths 10404A and 10404B (in embodiments where upper lengths 10404A and 10404B are parallel) and extends through both loops 10405A and 10405B. The ends of horizontal length 10409 may extend forward and outward into legs 10410A and 10410B for 870 millimeters, 800 millimeters, 900 millimeters, or another length. The front-most ends of legs 10410A and 10410B may then extend (i) upward at a ninety-degree angle, eighty degree angle, one hundred degree angle or some other angle, (ii) backward at a ninety-degree angle, eighty degree angle, one hundred degree angle or some other angle, and (iii) downward at a ninety-degree angle, eighty degree angle, one hundred degree angle or some other angle to form lumber hooks 10411A and 10411B. Lumber hooks 10411A and 10411B may be parallel to legs 10410A and 10410B or may appear at a ten-degree inward or outward angle with regard to legs 10410A and 10410B, a five-degree inward or outward angle, a fifteen-degree inward or outward angle, or another inward or outward angle.

As discussed in more detail below, the upper portion of the foothold connects to a mounting block secured to a substrate such as a roof, and the lower portion of the foothold connects to a two-by-four length of lumber or structurally similar component in order to form a rung, step, foothold, or toehold. When the substrate, such as a roof, rises upward at an angle, this rung, step, foothold, or toehold provides a surface on which a person may stand or to which a person may cling, or to which another component, such as a bucket, may be affixed.

Referring now to FIG. 2, a foothold is shown attached to a mounting block and flashing, where foothold 10501 is similar to foothold 10401 as shown and described in FIG. 1A and others, and to other footholds, mounting block 10524 with mounting portion 10526 is similar to mounting blocks and/or flashings, such as mounting blocks and flashing for use with PV modules or arrays of PV modules are shown and disclosed in detail at U.S. patent application Ser. No. 13/673,985 entitled "Solar Panel Attachment Method" filed approximately Nov. 9, 2012, which is incorporated by reference in its entirety. Foothold 10501 may attach to mounting block 10524 as follows. Upper portion 10502 is oriented such that attachment hooks (not shown, but similar to attachment hooks 10403A and 10403B in FIG. 1A) are positioned to enter attachment hook apertures 10517A and 10517B. Foothold 10501 is then moved laterally until attachment hooks 10403A and 10403B enter attachment hook apertures 10517A and 10517B. Upper portion 10402 is then rotated such that attachment hooks are pointing up and inside mounting block 10524. A length of metal, lumber, or other structural material 10519 may be attached to foothold 10501 by sliding through both lumber hooks 10511A and 10511B. Lumber 10519 may be attached to foothold 10501 before or after foothold 10501 is engaged with mounting block 10524. In this manner, foothold 10501 may be attached to mounting block 10524 to provide useful features during assembly of a PV array, such as a foothold, toehold, ledge, ladder, or utility hook. Foothold 10501 may be disengaged from mounting block 10524, such that foothold 10501 may be used in other locations on the roof, or other roofs. In some embodiments foothold 10501 may further comprise a higher-friction, rubber, or other gripping material (not shown) on an underside of lumber 10519 to further stabilize foothold when weight, such as that from a person, is placed near an end of lumber 10519. Since roofs are typically at an angle of 5° to 60°, a downward component of force applied above a gripping material resulting from a weight near the end of lumber 10519 may help to increase friction such that rotational forces on foothold about flashing block 10524 are substantially resisted.

Foothold 10501 may be used as a personal ladder system for a solar installer on a roof. For example, a series of mounting blocks 10524 may be installed for the purpose of receiving hardware that attaches solar panels to mounting blocks 10524. Then as solar panels are being mounted, an installer may move around on the roof by moving foothold 10501 from mounting block 10524 to mounting block 10524 such that foothold 10501 is placed into key positions when needed. In some embodiments an installer may connect foothold 10501 to a mounting block 10524 up-roof from a particular solar panel as such panel is being installed. Then the installer may move foothold over to a neighboring mounting block 10524 in order to install a neighboring solar panel.

In summary, disclosed is a foothold system for use on a sloped roof comprising a first flashing block (10524) comprising a hole (10517A, 10517B), a second flashing block (10524) comprising a hole (10517A, 10517B), a moveable foothold (10401, 10501) comprising a hook portion (10403A, 10403B) removably inserted into the first flashing block (10524) hole (10517A, 10517B) and a lower portion (10408, 10508) extending down-roof from the hook portion and comprising a step portion (10519), wherein the moveable foothold (10401, 10501) is moveable from the first flashing block (10524) to the second flashing block (10524) via unhooking the hook portion (10403A, 10403B) from the first flashing block (10524) and hooking the hook portion (10403A, 10403B) to the second flashing block (10524).

Also disclosed is the foothold system as noted above where the flashing blocks (10524) further comprise a mounting portion (10526) for receiving a mounting foot for a photovoltaic array. Also disclosed is the foothold system as noted above where the step portion (10519) is sized to receive and support a weight of a foot of a human working on the sloped roof.

Thus, preferably foothold system on a sloped roof includes first flashing block with hole, second flashing block with hole, moveable foothold with hook portion removably inserted into first flashing block hole and lower portion comprising a step portion extending down-roof from hook portion, the moveable foothold moveable from first flashing block to second flashing block via unhooking hook portion from first flashing block and hooking hook portion to second flashing block; flashing blocks may include mounting portion to receive mounting foot for photovoltaic array, and/or step portion sized to receive and support weight of foot of human working on sloped roof.

The invention claimed is:

1. A foothold system for use on a sloped roof, the foothold system comprising:
 a foothold configured to support a person, the foothold having:
 (a) an upper body portion with a pair of upwardly facing attachment hooks extending from a first end of the upper body portion and a utility hook extending from a second end of the upper body portion; and
 (b) a lower body portion with a pair of legs extending from a horizontal section, each leg terminating in a lumber hook, and
 wherein a center portion of the upper body portion is configured to rotate around the horizontal section of the lower body portion, and wherein the first and second ends of the upper body portion extend in opposite directions away from the center portion of the upper body portion such that the pair of attachment hooks and the utility hook are spaced apart from the center portion of the upper body portion, and
 a roof flashing having a mounting block thereon, the mounting block having a pair of apertures therein, wherein the upwardly facing attachment hooks are received into the apertures into the mounting block, thereby securing the foothold to the mounting block.

2. The foothold system of claim 1, wherein the pair of legs splay outwardly at an angle to one another.

3. The foothold system of claim 1, wherein the center portion of the upper body portion wraps around the lower body portion.

4. The foothold system of claim 1, wherein the upper body portion is an elongated member terminating in the pair of upwardly facing attachment hooks at opposite ends.

* * * * *